United States Patent [19]

Antonen

[11] 4,125,510

[45] Nov. 14, 1978

[54] METHOD OF IMPROVING CRACK RESISTANCE OF SILOXANE MOLDING COMPOSITIONS

[75] Inventor: Robert C. Antonen, Midland, Mich.

[73] Assignee: Dow Corning Corporation, Midland, Mich.

[21] Appl. No.: 773,364

[22] Filed: Mar. 1, 1977

[51] Int. Cl.² .......................... C08K 3/34; C08K 3/36; C08L 83/06

[52] U.S. Cl. .......................... 260/37 SB; 260/824 EP; 528/27

[58] Field of Search ......... 260/824 EP, 37 SB, 37 EP

[56] References Cited

U.S. PATENT DOCUMENTS

| | | | |
|---|---|---|---|
| 3,170,962 | 2/1965 | Tyler | 260/824 EP |
| 3,358,064 | 12/1967 | Belko | 264/824 EP |
| 3,368,893 | 2/1968 | Garrett | 260/824 EP |
| 3,779,988 | 12/1973 | Rembold et al. | 260/37 SB |
| 3,842,141 | 10/1974 | Fetscher et al. | 260/824 EP |
| 3,957,717 | 5/1976 | Harada et al. | 260/37 SB |
| 3,969,308 | 7/1976 | Penneck | 260/824 EP |
| 3,971,747 | 7/1976 | Bank et al. | 260/824 EP |

FOREIGN PATENT DOCUMENTS

| | | | |
|---|---|---|---|
| 737,142 | 9/1955 | United Kingdom | 260/824 EP |
| 737,614 | 9/1955 | United Kingdom | 260/824 EP |
| 864,697 | 4/1961 | United Kingdom | 260/824 EP |

OTHER PUBLICATIONS

Hach's Chemical Dictionary, Fourth Edition, 1969, p. 610.

*Primary Examiner*—Allan Lieberman
*Attorney, Agent, or Firm*—Robert F. Fleming, Jr.

[57] ABSTRACT

The crack resistance of phenyl silicone molding compounds containing siliceous fillers is improved by incorporating therein from 4 to 15 percent by weight based on the combined weight of the resins of an aromatic epoxy resin having an epoxide equivalent of from 475 to 2000. These molding compounds are particularly suitable for encapsulating electronic devices such as diodes.

7 Claims, No Drawings

METHOD OF IMPROVING CRACK RESISTANCE OF SILOXANE MOLDING COMPOSITIONS

BACKGROUND OF THE INVENTION

Silicone molding compounds have been known for many years and their uses include, among others, the encapsulation of electrical and electronic devices. Because of their excellent thermal stability and dielectric properties, and their usefulness over a wide temperature range, silicone resins are widely used in this application. However, one of the problems with silicone molding compounds is the fact that their crack resistance leaves something to be desired. This is true both with respect to external stresses brought about by mechanical means and internal stresses caused by rapid fluctuations in temperature. When the encapsulant on an electronic device cracks, foreign material can come into contact with the device and cause failure. Consequently, it is important that the crack resistance of silicone molding compounds be improved.

Silicone-epoxy copolymers and mixtures are also well known both for coating applications and for molding applications. The problems involved in coatings are generally different from those involved in molding and encapsulating. A coating material is usually applied in relatively thin section and, hence, is less subject to internal stresses which cause cracking than encapsulating material which is generally employed in thicker section. Furthermore, the coating material is in contact with the surface of a substrate, whereas an encapsulating material envelopes the substrate. For this reason, stresses built up in encapsulants differ in order of magnitude from those encountered by coatings.

It is known from such patents as U.S. Pat. No. 3,170,962 that copolymers of organosiloxanes and epoxies can be used in coating applications in which the weight percent of epoxy varies from 1 to 99 percent of the total combination. It is also known that from U.S. Pat. No. 3,368,893 that electrophotographic coatings can be made by bonding zinc oxide with silicone epoxy combinations varying from 0 to 100 percent epoxy and this patent specifically shows in Table III a combination of 10 percent epoxy and 90 percent silicone used to bond zinc oxide.

However, when one comes to the use of silicone-epoxies in molding applications, such as copolymers shown by U.S. Pat. No. 3,842,141, the combination is used in the amount of 60 to 85 percent by weight epoxy and from 40 to 15 percent by weight of silicone. The same is true in U.S. Pat. No. 3,971,747 which shows blends of silicone and epoxies used in molding applications in which the amount of epoxy ranges from 40 to 85 percent by weight of the total resin combination. Thus, it can be seen that in molding applications, the art does not suggest the use of lower amounts of epoxy within the range specified in this application.

Applicant has discovered that when the epoxy resin is employed in an amount of from 4 to 15 percent by weight based on the weight of the total silicone and epoxy resin, improved crack resistance as shown by improved thermal shock is obtained in a silicone molding compound containing siliceous fillers. Not only is the crack resistance of the molding compound improved, but also there is an improvement in the resistance to salt water and the compositions are less flammable than the silicone-epoxy molding compounds of the above patents. Flammability increases with increasing epoxy resin content.

STATEMENT OF INVENTION

This invention relates to a method of improving the crack resistance of siloxane resin molding compositions consisting essentially of (1) a phenylsiloxane resin containing silicon-bonded hydroxyl groups and having a phenyl to silicon ratio of 0.3:1 to 0.9:1 and an R to silicon ratio of 0.4:1 to 1.1:1 and a total phenyl plus R to Si ratio of 1:1 to 1.4:1, in which R is an aliphatic hydrocarbon radical of 1 to 2 C atoms and (3) a siliceous filler in amount of from 70 to 85 percent by weight based on the total weight of the composition, the improvement comprising adding to the composition from 2 to 15 percent by weight based on the weight of (1) and (2) of (2) an aromatic epoxy resin having an epoxy equivalent weight of not more than 2000.

DETAILED DESCRIPTION OF THE INVENTION

The preferred amount of epoxy resin is from 4 to 12 percent based on the weight of (1) and (2) and the preferred epoxy equivalent of the epoxy resin is in the range from 300 to 1000. The term "epoxy equivalent weight" means the grams of resin containing one epoxy group. Thus, if the resin contains two epoxy groups, the molecular weight is twice the epoxy equivalent weight. Any aromatic epoxy resin can be employed in this invention. The term "aromatic epoxy resin" means that the epoxy resin is derived from aromatic ols such as phenols, naphthols, etc. The epoxy resin can contain on the average 2 or more epoxy groups per molecule. Various types of epoxy resins well known in the art are those which are derived from phenols such as bisphenol A and Novolacs which are condensation products of phenol with various aldehydes. Specific examples of the latter are diphenols, triphenols, pentaphenols or heptaphenols such as those that are described in U.S. Pat. Nos. 2,885,385 and 3,284,398, both of which are incorporated herein by reference.

The siloxane resins employed in this invention are well known articles of commerce and they are phenyl siloxane resins containing silicon-bonded hydroxyl groups and can be composed of copolymers or blends of copolymers of any combination of monophenylsiloxane units, diphenylsiloxane units, phenylmethylsiloxane units, dimethylsiloxane units, monomethylsiloxane units, vinylsiloxane units, phenylvinylsiloxane units, methylvinylsiloxane units, ethylsiloxane units, phenylethylsiloxane units, ethylmethylsiloxane units, ethylvinylsiloxane units or diethylsiloxane units having the phenyl to silicon and R to silicon ratios shown above. These resins contain sufficient siliconbonded hydroxyl to ensure cure during molding and they may contain small amounts of $R'_3SiO_{.5}$ units where $R'$ is phenyl, methyl, ethyl or vinyl. If desired, the resins can contain small amounts of siloxane polymers outside the scope of the above range which are used to modify the properties of the molded article.

The primary fillers used in the compositions of this invention are siliceous fillers such as crushed amorphous silica, crushed crystalline silica, fume silica, glass, silicates such as aluminum silicate, calcium aluminum silicate, etc. These materials can be particulate or fibrous and often it is advantageous to use a combination of both particulate and fibrous fillers.

Catalysts employed to cure the compositions of this invention are conventional silanol condensation catalysts used for curing siloxane molding compounds. As is well known these materials can be amines, amine salts or metal carboxylic acid salts such as those of lead, tin, aluminum, iron, cobalt, etc. When vinyl is present in the siloxane, one can employ peroxides in combination with the conventional siloxane condensation catalyst such as those shown above.

In order to prepare the molding compounds used in this invention, the ingredients are mixed if desired at somewhat elevated temperature in any convenient manner and the compositions can then be molded to the desired shape by heating 1 to 2 minutes at 175° C. at a pressure, for example, of 500 to 1000 p.s.i. In order to develop maximum strength it is often desirable to post cure the compositions at 150° to 200° C. for from 2 to 4 hours or longer.

If desired, additives such as pigments, flame retardants, oxidation inhibitors, mold release agents, etc. can be employed along with the essential ingredients in the compositions employed in this invention.

The following examples are illustrative only and should not be construed as limiting the invention which is properly delineated in the appended claims.

EXAMPLE 1

This example shows the effects of varying the amount of the epoxy resin relative to the silicone resin.

Silicone resin (1) employed in this invention was a copolymer of 45 mole percent monomethylsiloxane, 5 mole percent phenylmethylsiloxane, 40 mole percent monophenylsiloxane, and 10 mole percent diphenylsiloxane. This copolymer contained about 5.0 percent by weight silicon-bonded hydroxyl groups.

The epoxy resin (2) employed herein was a diglycidyl ether of bisphenol A having an epoxide equivalent weight of 730 to 840. Several formulations were prepared by varying the weight ratio of epoxy resin relative to the silicone resin as is shown in the table below. All ingredients are expressed in percent by weight based on the weight of the total composition. In each case the formulation employed was 20 percent by weight of (1) plus (2), 59.375 percent by weight crushed amorphous silica, 20.000 percent by weight 1/32 inch (0.8 mm.) glass fibers, 0.375 percent carbon black and 0.250 percent calcium stearate lubricant. To this formulation was added 1.250 percent lead carbonate, 1.250 percent benzoic acid and 0.250 percent aluminum benzoate all based on the combined weights of resins (1) and (2).

Each formulation was molded into bars by heating 1.5 minutes at 177° C. at 800 p.s.i. and each sample was post cured 4 hours at 175° C. The flexural strength of the molded bars was then determined.

The crack resistance of the formulation was determined by encapsulating button diodes with the formulation by molding 2 minutes at 177° C. at 500 p.s.i. and then post curing each encapsulated diode 4 hours at 175° C. Each molded diode was then checked for shock resistance by heating 30 minutes at 250° C. and then plunging immediately into ice water. This cycle was repeated with each diode using 20 diodes encapsulated in each composition and the cycle at which the encapsulant first cracked was recorded in the table below. The number of the 20 samples failing after each cycle is shown and the total number of samples failing during the entire test is given in the last column.

TABLE I

| % By Wt. (1) | % By Wt. (2) | Flexural Strength p.s.i. As Molded | Flexural Strength p.s.i. After Post Curing | Heating Cycles 1 | Heating Cycles 2 | Heating Cycles 5 | Heating Cycles 10 | Total Samples Which Cracked After 5 Cycles | Total Samples Which Cracked After 10 Cycles |
|---|---|---|---|---|---|---|---|---|---|
| 20 | 0 | 11,028 | 12,217 | 7 | 5 | 5 | — | 18* | 18 |
| 19.6 | 0.4 | 11,042 | 12,533 | 2 | 3 | 5 | 9 | 10 | 19 |
| 19.2 | 0.8 | 11,115 | 12,480 | 0 | 0 | 2 | 8 | 2 | 10 |
| 18.8 | 1.2 | 10,917 | 12,159 | 0 | 0 | 2 | 10 | 2 | 12 |

*One cracked during post cure.

This example shows that there is some improvement in the crack resistance of the combination at 2 percent by weight epoxy based on the weight of the total resin but that more improvement is obtained with 4 or more percent by weight epoxy based on the weight of total resin.

EXAMPLE 2

This example shows the effect of epoxy equivalent weight on the crack resistance of the molded articles.

The silicone resin employed herein was that used in Example 1. The epoxy resins employed were all diglycidyl ethers of bisphenol A but the epoxy equivalent weight of the various epoxy resins varied as shown in Table II below. In each case the formulations employed were 20 percent by weight of (1) plus (2), 59.538 percent by weight of crushed amorphous silica, 20 percent of 1/32 inch (0.8 mm.) glass fibers, 0.275 percent carbon black and 0.187 percent zinc stearate lubricant. To this formulation was added 1.5 percent lead carbonate, 1.5 percent benzoic acid and 0.25 percent by weight aluminum benzoate all based on the combined weights of silicone and epoxy resin. Each sample was employed to encapsulate 20 diodes as shown in Example 1 and was subjected to the crack testing by the method of that Example. The results are shown in the table below.

TABLE II

| Epoxy Equivalent Weight of Epoxy Resin | % Epoxy Resin | % Silicone Resin | Heating Cycles 1 | Heating Cycles 2 | Heating Cycles 5 | Heating Cycles 10 | Heating Cycles 15 | Total Samples Which Cracked |
|---|---|---|---|---|---|---|---|---|
| 475–575 | 2.0 | 18 | 0 | 0 | 0 | 0 | 0 | 0 |
| 730–840 | 2.0 | 18 | 0 | 0 | 0 | 2 | 4 | 6 |
| 1600–2000 | 1.2 | 18.8 | 1 | 4 | 9 | — | — | 14 |

TABLE II-continued

| Epoxy Equivalent Weight of Epoxy Resin | % Epoxy Resin | % Silicone Resin | Heating Cycles | | | | | Total Samples Which Cracked |
|---|---|---|---|---|---|---|---|---|
| | | | 1 | 2 | 5 | 10 | 15 | |
| 730-840 | 1.2 | 18.8* | 0 | 0 | 0 | 1 | 2 | 3 |

The third run shows the upper molecular weight range of the epoxy resin as shown by epoxy equivalent weight.
*This silicone resin was a mixture of 90 percent by weight of the silicone resin of Example 1 and 10 percent of a block copolymer of monophenylsiloxane and dimethylsiloxane in which the dimethylsiloxane blocks average about 40 dimethylsiloxane units. The block copolymer was 60 mole percent dimethylsiloxane, 36 mole percent monophenylsiloxane and 4 mol percent phenylmethylsiloxane.

EXAMPLE 3

This example shows that the formulations behave equally well with and without the presence of aluminum. The formulation used was a mixture of 18 percent by weight of a mixture of 90 percent by weight of the silicone resin of Example 1 and 10 percent by weight of the block copolymer of Example 2, last run, 2 percent by weight of a diglycidyl ether of bisphenol A having an epoxy equivalent of 475 to 575, 59.25 percent by weight of crushed amorphous silica, 20 percent by weight of 1/32 inch (0.8 mm.) glass fibers, 0.125 percent by weight carbon black, 0.125 percent by weight of a methyl hydrogen polysiloxane fluid, 0.5 percent by weight of fume silica. To this mixture was added 0.67 percent lead carbonate, 0.44 percent of the stearate salt of 2,4,6-(dimethylaminomethyl) phenol, 0.56 percent aluminum stearate and 0.28 percent benzoic acid all based on the combined weights of the silicone and epoxy resin.

Formulation (2) was identical with formulation (1) except that the aluminum stearate was omitted. Each formulation was molded into test bars as shown in Example 1 and then post cured 2 hours at 250° C. The flexural strengths were as follows: Formulation (1) as molded 9505 p.s.i., after post curing, 12,453 p.s.i. Formulation (2) as molded 8182 p.s.i., after post curing 13,054 p.s.i. Each sample was then used to encapsulate 50 diodes and each of these diodes was tested for crack resistance employing the thermal shock test of Example 1. After 10 cycles, one of the 50 samples encapsulated with formulation (1) had cracked and none of the 50 samples of formulation (2) had cracked.

That which is claimed is:

1. A method of improving the crack resistance of siloxane molding compositions consisting essentially of
   (1) a phenyl siloxane resin containing silicon-bonded hydroxyl groups and having a phenyl to silicon ratio of 0.3:1 to 0.9:1 and an R to silicon ratio of 0.4:1 to 1.1:1 and a total phenyl plus R to silicon ratio of 1:1 to 1.4:1 in which R is an aliphatic hydrocarbon radical of 1 to 2 C atoms, and (3) from 70 to 85 percent by weight of a siliceous filler based on the total weight of the composition, the improvement comprising adding to the composition from 2 to 15 percent by weight, based on the combined weights of (1) and (2) of
   (2) an aromatic epoxy resin having an epoxy equivalent weight of not more than 2000.

2. The method of claim 1 in which the epoxy resin is a diglycidyl ether of bisphenol A.

3. The method in accordance with claim 2 in which the epoxy resin has an epoxy equivalent weight of 300 to 1000.

4. The method of claim 3 in which the epoxy resin is employed in amount from 4 to 12 percent by weight based on the combined weights of (1) and (2).

5. The method of claim 2 in which R is methyl.

6. The method of claim 3 in which R is methyl.

7. The method of claim 4 in which R is methyl.

* * * * *

UNITED STATES PATENT AND TRADEMARK OFFICE
CERTIFICATE OF CORRECTION

PATENT NO. : 4,125,510
DATED : November 14, 1978
INVENTOR(S) : ROBERT C. ANTONEN It is certified that error appears in the above–identified patent and that said Letters Patent are hereby corrected as shown below:

Column 1, line 33, "envelopes" should read --envelops--

Column 2, line 55, "siliconbonded" should read --silicon-bonded--

Signed and Sealed this

Sixteenth Day of September 1980

[SEAL]

Attest:

SIDNEY A. DIAMOND

Attesting Officer — Commissioner of Patents and Trademarks